United States Patent [19]
Booth

[11] 3,880,379
[45] Apr. 29, 1975

[54] RETRACTOR WITH SWITCH

[75] Inventor: Frederick C. Booth, Birmingham, Mich.

[73] Assignee: Allied Chemical Corporation, New York, N.Y.

[22] Filed: Dec. 21, 1971

[21] Appl. No.: 210,532

[52] U.S. Cl....... 242/107.4; 200/52 R; 200/61.58 B
[51] Int. Cl..... A62b 35/00; H01h 3/16; B65h 63/08
[58] Field of Search........ 242/107.4, 107.7, 107 SB; 297/384, 385, 382, 388, 387; 280/150 S; 340/52 E; 200/61.58 B, 52 R, 153 LB, 61.16, 164 R, 164 A, 242, 253

[56] References Cited
UNITED STATES PATENTS

| 1,094,690 | 4/1914 | Wood | 200/153 LB |
| 3,504,336 | 3/1970 | Boblitz | 340/52 |
| 3,659,801 | 5/1972 | Romanzi, Jr. | 242/107.4 |
| 3,667,698 | 6/1972 | Fisher | 242/107.4 |
| 3,693,147 | 9/1972 | Seo et al. | 340/52 E |
| 3,744,732 | 7/1973 | Fowler | 242/107 SB |
| 3,767,134 | 10/1973 | Morales | 242/107.4 |

Primary Examiner—Stanley N. Gilreath
Assistant Examiner—John M. Jillions
Attorney, Agent, or Firm—Clayton Smith; John P. Kirby, Jr.

[57] ABSTRACT

A reel-type retractor for a safety belt, having the feature that a retractor for either right hand or left hand operation can be assembled from the identical components. The contacts of a signal switch, incorporated into the retractor, have the feature of making positive wiping electric contact.

14 Claims, 3 Drawing Figures

3,880,379

RETRACTOR WITH SWITCH

BACKGROUND OF THE INVENTION

1. Field of the Invention

This invention relates to vehicle safety seat belt retractors, and more particularly to those which incorporate a switch to activate a signal device when the passenger using the seat equipped with such a retractor is not using the seat belt. In addition, this invention relates to a retractor which may be fastened directly to the frame of a vehicle for either right handed or left handed operation, using identical components, thus eliminating the need for special components for the two types of retractors.

2. Description of the Prior Art

The advantages of retracting means for vehicle safety belts by which belts are drawn out of the way when not in use are well known. It is also known to include in such seat belt retractor assemblies, electric signal switches which may be employed in an electric circuit together with auditory and/or visual signal devices, whereby the driver is made aware that a seat belt in an occupied seat is not in use.

In simple retracting devices, one type of retractor can sometimes be used on either side of the car for what we term left hand or right hand use. Even when this is possible, additional angled components are often required to make sure the belt can be extended and retracted freely, without pinching or binding.

Many modern retractors, however, are complicated, and include in their assembly such components as an electric signal switch, a pawl bar, and means for preventing the locking of the reel when the belt is being withdrawn for use, while triggering the locking engagement of the take-up reel the moment there is any momentary retraction of the safety belt, however slight. With such complicated structures it has been quite difficult if at all possible, to provide one set of components suitable for the assembly of both a left handed and right handed retractor.

SUMMARY OF THE PRESENT INVENTION

In accordance with the present invention I have now provided a retractor assembly, the components of which are adaptable for assembly into a retractor for left hand operation or one for right hand operation. This is accomplished by providing two sets of openings and slots for the pawl bar assembly, so that it can be readily mounted for operation on either side of the reel. The ratchet teeth on the reel flanges can be directed as desired by selecting the appropriate face of the reel flange to be concentrically secured to the tube on which the belt is wound. The clutch plate for holding the pawl bar out of engagement with the ratchets when the belt is first extended, may be turned one way or the other depending on whether the assembled retractor is to be adapted for left handed or right handed operation. Finally, the coil spring providing take-up torque to the slotted end of the reel shaft, may be turned one way or the other to provide torque in the direction desired for the particular retractor being assembled.

Furthermore, I have provided a novel switch in which a one-piece, cam-operated flexible contact arm comprises the lead-in wire connector, spring biasing means and contact shoe. This element is fabricated from one flexible conducting ribbon. A cam surface extending from the perimeter of a ring gear, the teeth of which are internal, is driven through a gear train by the reel shaft, and presses the contact shoe into wiping contact with a grounded metal strip. This gradual applied pressure causes the shoe to flex into a position where it becomes substantially parallel to the grounded metal strip, thus increasing the area of contact. The wiping action provides good electric contact even after long use, since a non-conductive deposit cannot build up between the contact points.

The objects and advantages of the constructions of the present invention may be better understood by reference to the following detailed description when considered in connection with the accompanying drawings.

BRIEF DESCRIPTION OF THE DRAWINGS

The description refers to the accompanying drawings in which like reference characters refer to like parts throughout the several views.

DETAILED DESCRIPTION

Figure 1:
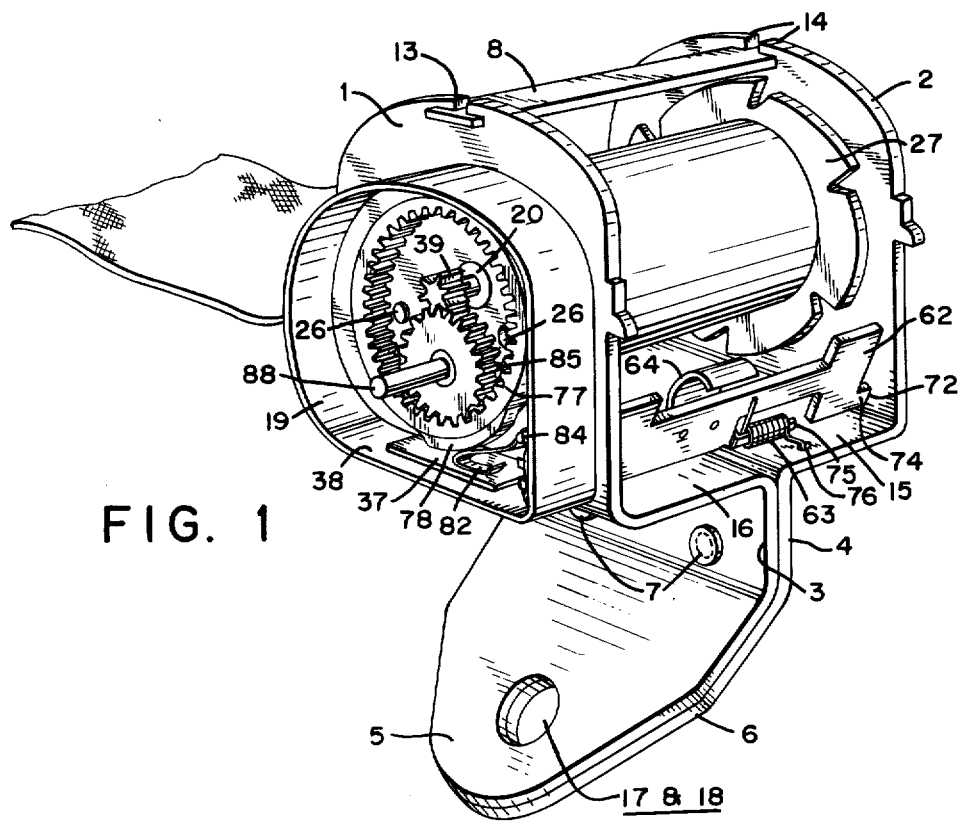
FIG. 1 is a perspective view of a safety seat belt retractor, illustrating the preferred embodiment of the invention, showing the belt partially wound on the reel. A cover or housing for the reel's structure including an opening to guide the belt onto the reel is not shown.
Figure 3:
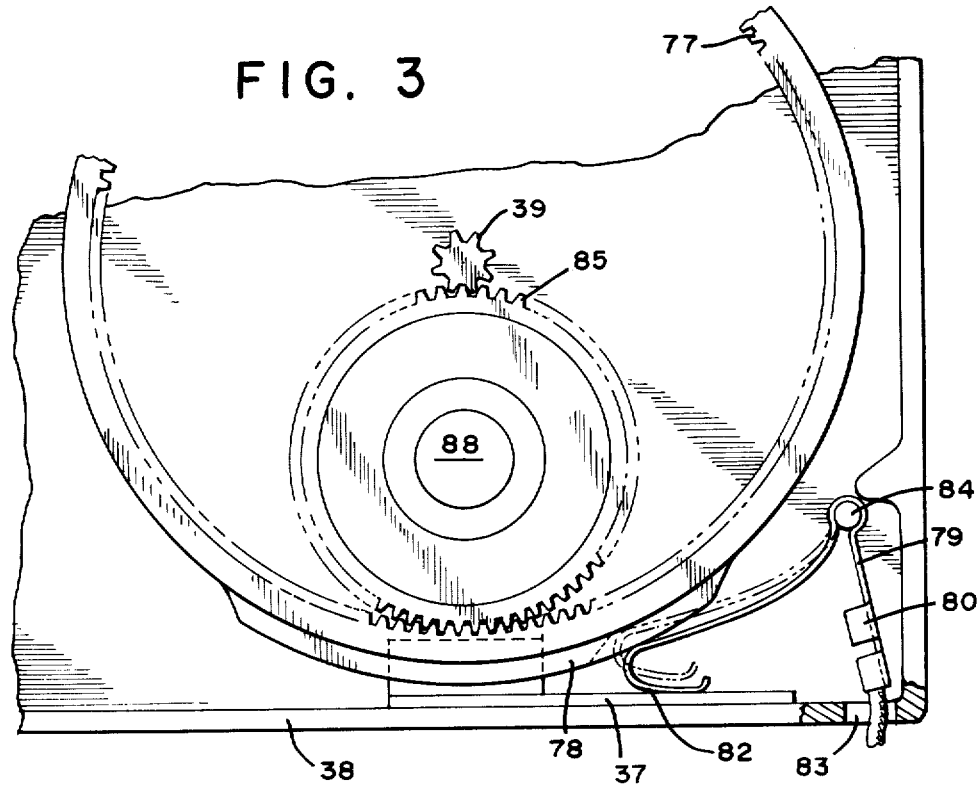
FIG. 3 is an enlarged cutaway side view in elevation showing a portion of the gear train and electric switch. The relationship between the cam and the movable switch arm is shown in continuous line when the switch is in closed position. Also shown, in phantom, is the relationship between the cam and the movable switch arm when the switch is in open position.
Figure 2:
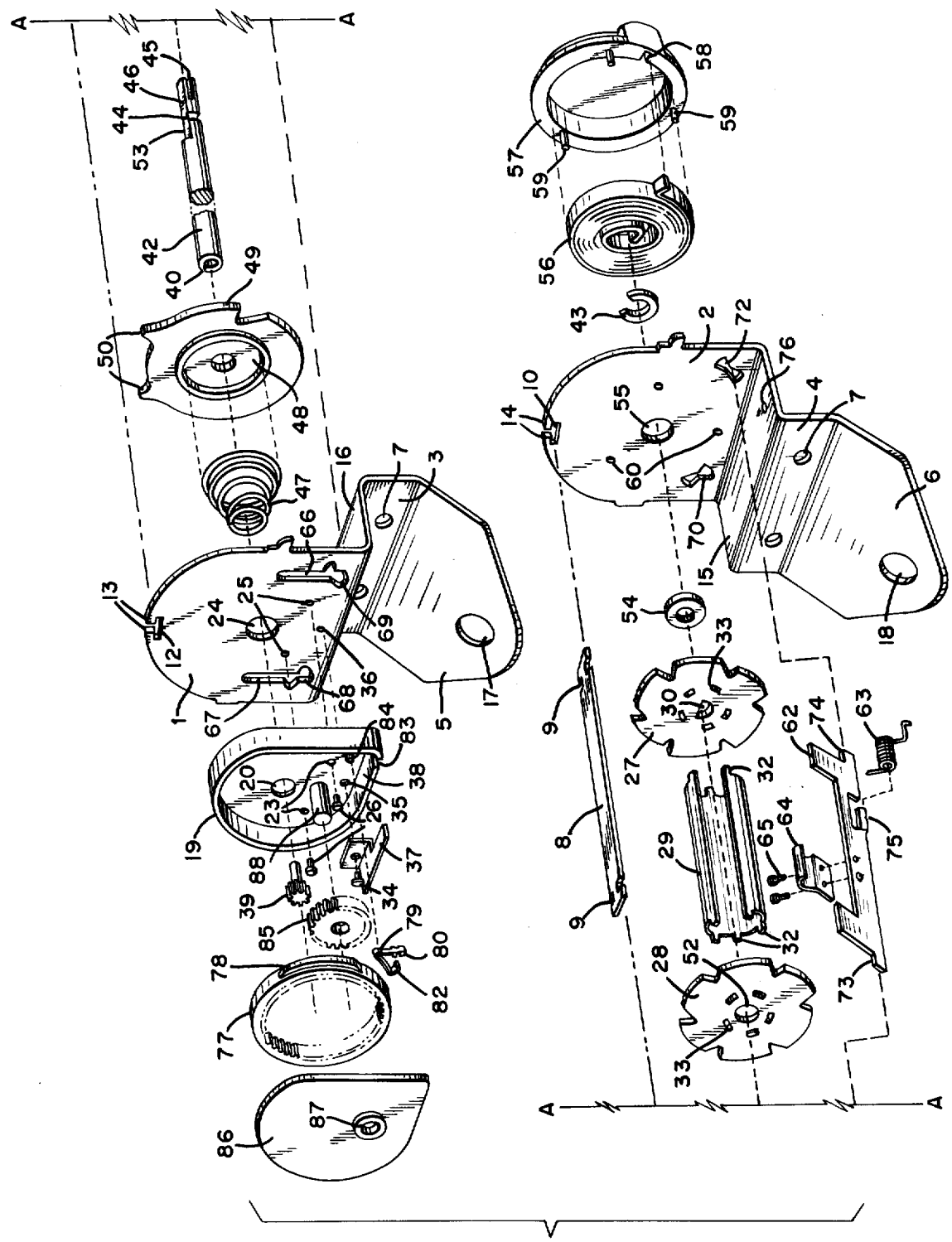
FIG. 2 is an exploded view of the preferred retractor of FIG. 1. The seat belt is not included.

Referring now to the preferred retractor assembly of FIG. 1 and particularly to the exploded view of FIG. 2: Preformed metal plates 1 and 2 are brought together so that areas 3 and 4, as well as areas 5 and 6 at the lower end of the elongated strips, are made contiguous. These two angled metal plates, which comprise the supporting frame, are fastened together at points 7, preferably by spot welding. If desired, however, they can be drilled and bolted or riveted together. The upper portions of plates 1 and 2 now comprise the parallel walls of the supporting frame and areas 15 and 16 combine to form the base of the retractor. Areas 5 and 6 now constitute the angled tongue which is of double thickness for added strength and rigidity. Openings 17 and 18 coincide or may be drilled or punched after the support frame is assembled. This angled tongue is adapted for attachment to the frame of a vehicle, the angle being selected for the best operation of the retractor in accordance with the design of the particular vehicle in which it is to be installed.

Should it be desired to assemble the retractor as it appears in the drawings so that the belt may be extended in a forward direction, the pawl bar also referred to as latch bar must be placed to the rear. To do this, it is faced about and inserted through slot 67 of support wall 1 until end 73 engages hourglass opening 70 in support wall 2. End 74 of the pawl bar now drops into opening 68 of support wall 1. In either position the latch should now be assembled by slipping coiled spring 63 over extending arm 75 of the latch bar. The spring should be placed under tension with the straight end pressed against the face of the latch bar as shown in FIG. 1 and the curved end dropped into opening 76 of support wall 2, or the corresponding opening in support wall 1, depending on which side of the reel the latch bar is placed. Webbing follower 64 is attached to latch bar 62 as shown in FIG. 1 preferably by riveting 65. This webbing follower is positioned so as to hold the latch bar completely out of contact with the reel flanges against the biasing effect of spring 63. When the roll of webbing or belting on the reel is substantially the maximum amount, and no more than a few inches of belting are extended, spring 63 urges pawl bar 62 into engagement with the ratchets of reel flanges 27 and 28.

Housing 19 for the gear train and electric switch is positioned against the outer wall 1 of the support and fastened as by riveting to the support wall. In the accompanying drawing, rivets 26 are shown as passing through openings 23 for riveting into openings 25 of support wall 1. Grounded strip 37 sometimes called a "hot runner" is placed flat against the bottom inner surface 38 of housing 19, and secured in place by rivet 34 passing through the opening in the grounded strip and through the opening 35 in the rear of the housing, to rivet the strip into opening 36 in support wall 1. Metal to metal electric contact is thereby achieved between the strip and the support, ultimately grounding it to the frame of the vehicle through tongue 5 and 6 as it is secured thereto.

Ring gear 77 is an internally toothed gear, having a raised cam surface on a section of its perimeter. The cam surface covers a section of the ring gear's perimeter, equivalent to between about one/fourth and one/-sixth of the total distance, and is parallel to the perimeter, having a radius preferably between about 1 to 3 millimeters (mm) greater than the perimeter of the ring gear. This cam surface is smooth with the approach ramps from the ring gear's perimetrical surface being gently sloping over a distance of preferably between about 2 and 5 mm as measured along the rings gear's perimeter. These distances are not critical and may be varied with the dimensions selected for the component parts.

The ring gear is placed in housing 19 wherein it is rotatable in a circular recess at the rear of the housing. Switch element 79 preferably fabricated in one piece from phosphor bronze ribbon, is placed in the lower right hand corner of housing 19, with its upper loop supported by support member 84 attached to the wall of said housing. End 80 of the switch component 79, has been fabricated into a connector for a lead-in wire which may enter the housing through opening 83. The other end of switch component 79 has been bent to form a contact shoe with upturn toe, and the entire component is sufficiently flexible so that shoe 82 does not normally contact flat strip 37 in the bottom of the housing. When ring gear 77 is rotated until cam 78 presses against the heel of shoe 82, it presses said shoe into electrical contact with strip 37. When the cam first approaches the switch member, the sloping ramp to the cam surface presses the toe of the contact shoe against grounded strip 37, and as the sloping ramp continues to increase the pressure, the resilient shoe bends at the heel, and the toe slides along contact strip 37 making a good wiping contact until, by the time the cam is exerting its maximum pressure, the shoe is substantially parallel to the contact strip 37, and is contacting the strip over an appreciable area. A feature of this arrangement is that the ring gear can be rotated and "set" in relation to the switch, so that when the belt is retracted, the switch is in closed or "on" position, but when sufficient belting has been withdrawn from the retractor for buckling, the cam will have rotated to a position where the contact points are open. The amount of extended belting that can be taken as an indication that the belt is in use, will vary with the design of the vehicle in which it is installed, hence the advantage of being able to pre-set the switch by rotating the ring gear to correspond to an amount of belt, the extension of which will indicate that the safety belt is in use. Once the ring gear has been rotated to the desired position, pinion gear 85 is slipped on spindle 88 where it meshes both with spur gear 39 attached to the reel shaft at 40 entering through opening 20, and with the internal teeth of ring gear 77, thus completing the gear train. Cover 86, preferably of transparent polymeric material, can now be fastened by cementing or other means, to housing 19, with spindle 88 extending through opening 87 to provide additional strength and rigidity. Finally, clutch plate 48 is set in a vertical position and spacer bar 8 is placed in slots 12 and 10 of support walls 1 and 2, respectively, and locked into place by notches 9 of spacer bar 8. It may be positioned permanently by crimping tabs 13 and 14 of support walls 1 and 2. Since clutch plate 48 was set in a verticle position, the spacer bar falls between ears 50. The clutch plate may then rotate to a limited degree, being stopped in either direction when one of the ears contacts the spacer bar 8.

DESCRIPTION OF THE PREFERRED EMBODIMENT

The preferred embodiment of the present invention comprises a support adapted to be fixedly connected to a vehicle and provided with a pair of spaced parallel walls. A spring-biased reel is journaled on the walls and connected to one end of the seat belt so that as the reel is rotated in one direction the belt is retracted into a roll and as the belt is unwound from the reel, it rotates in the opposite direction. The inner terminus of spring 56 engages slot 45 of reel shaft 42, and the outer terminus engages slot 58 in spring cover 57. Washer 54 separates flange 27 from sidewall 2, and lockwasher 43 snaps into recess 44 of the reel shaft. The reel flanges have ratchet faces on the periphery designed for free motion in the direction of belt retraction, but for locking engagement with a pawl in the direction of belt extension. A pawl bar is mounted on the support for motion between a first position in which it is engageable with the ratchets and a second position in which it is separated from the ratchets. The pawl bar is biased in the direction in which it is in locking engagement with the ratchets. There is, however, also included in the assembly, a clutch plate, biased by a spring 47 into frictional contact with the outer surface of one of the reel flanges, so that it may rotate on the reel shaft between stops, into two positions. In the first position, to which it moves when the belt or webbing is being withdrawn and when the pawl is held out of contact with the reel by the webbing follower, a protruding portion 49 of the periphery of the clutch plate blocks the pawl from engaging the ratchet, whereas, in the second position to which the clutch plate rotates when the belt is being retracted, no protrusion blocks the engagement of the pawl with the ratchets.

It will be noted, however, that one requirement for the first position is that the pawl be held out of contact with the reel by the webbing-follower. The webbing-follower which is a shoe attached to the pawl bar, and which glides over the surface of the belt on the reel, is only effective when the reel is substantially full, for as the roll of belting diminishes, the webbing-follower permits the pawl to move closer to the ratchet until the blocking action is taken over by the clutch plate. It is clear then, that first the webbing-follower and later the clutch plate, blocks the locking action of the pawl bar when the belt is continuously withdrawn. The moment the belt is retracted however, even for the small fraction of an inch, the clutch plate moves into the second position and the pawl engages the ratchet. As was seen, the only exception to this action is when the reel is substantially full and the webbing-follower assumes the task of blocking the locking action. This only occurs when no more than a few inches of belt have been withdrawn. The reason for the rapid change of the clutch plate from position 1 to position 2, is that the protruding portion of the periphery of the clutch plate that blocks locking action, ends abruptly in a sharp shoulder, so that when the clutch moves in the direction of belt retraction for a fraction of an inch, the spring-biased pawl snaps off the shoulder and into locking engagement with the ratchets.

Additionally, there is incorporated into the seat belt retractor, a novel cam-operated electric signal switch. The switch consists of a grounding strip which is riveted to the support, and a positive contact shoe which makes wiping contact with the grounded strip and is itself fabricated from one ribbon of flexible conductor such as phosphor bronze. This single ribbon comprises the connector for the attachment of a lead-in wire, its own biasing means, being biased into an open circuit position, and a contact shoe for making a wiping and positive contact with the grounding strip.

To further define the supporting frame of the present invention, the two parallel walls of the frame into which the reel shaft 42 is journaled at 24 and 55, comprise the upper portion of two elongated metal plates. These parallel walls are prepunched or drilled, so as to provide the necessary openings for the assembly of the components, which they are to support. There are included two sets of openings for the pivoting ends of the pawl bar 68, 69, 70 and 72 and for the free end of the biasing spring of the pawl bar, one set of openings being a mirror image of the other, and symmetrically placed with respect to each other, so that it is possible to position the pawl for either right or left-handed operation with respect to the reel. The openings within which the ends of the pawl bar pivot, are shaped somewhat like a longitudinal section of an hour-glass, in that each opening has a narrow waist above and below which it flares out into a small fan-shaped area. The narrow waist has a width slightly greater than the thickness of the material of which the pawl is composed, and the height of the opening is slightly greater than that of the height of the end of the pawl. With this arrangement, the rocking motion of the pawl is limited by the shape of the opening from a position of locking engagement with the ratchets, to one wherein the pawl is out of contact with the reel. In the case of one of the two walls, preferably that most distant from the take-up spring of the reel, the hour glass openings therein are slotted upwardly, 66, 67 so as to provide an overall height slightly greater than that of the pawl and a width slightly greater than the thickness of the pawl, whereby the pawl may be inserted into position through the slot, for rocking motion as limited by the hour glass shaped openings. In the wall having the slots, there are, in addition to the journal for the reel shaft and the hour glass openings, two openings for the attachment of a housing for the electric switch and the gear train and cam which is to operate it. Also, near the bottom, there is a small hole for attaching the grounding-plate of the switch, to thus ground it to the support frame of the retractor and thence to the frame of the vehicle. In the opposite wall, there are in addition to the shaft journal and the hour glass openings, additional openings 60 for pins 59 of cover 57 of the retractor spring 56. Finally, both walls have a slotted opening at the top for the attachment of a tie rod or spacer strip, to add rigidity to the structure and provide a "stop" for the rotation of the clutch plate.

Returning once again to the supporting walls which in the preferred embodiment, comprise the upper portion of two elongated plates, one or both of these plates are bent into substantially a 90° angle, along the line which represents the bottom edge of the wall and its junction with the base. The now horizontal portions of the plates extend towards each other for a distance such that their total distance is equal to that chosen for the distance between the walls. They are now again bent downwardly so that when the extended pieces are made contiguous, they constitute a downwardly extending tongue from the base of the retractor.

These two contiguous lengths of metal plate constituting a tongue are now fastened together by spot welding or riveting, preferably at a point just beneath the base of the retractor. The tongue can now be angled for convenient attachment to the frame of a vehicle. An opening is punched or drilled near the end of the tongue to aid in this attachment.

As previously mentioned, the components of which this retractor is comprised can be assembled to provide either a right-handed or left-handed buckle retractor. The reel with ratchets comprises two reel flanges with ratchets stamped or punched into their periphery. At least one of these flanges having openings 52 and 30 must be keyed to the reel shaft. In the preferred embodiment, this is achieved by using a D-shaped opening 30 which corresponds to the end of the shaft 53 over which it is to be placed, which has a flat section 46 and therefore a D-shaped cross section. The flanges are attached concentrically to a metal "C" tube, 29, the inside diameter of which is sufficiently larger than the shaft, to permit a loop of a safety belt to be secured around the shaft within the concentric space between shaft and tube. The tube has a C-cross section, so that the belt may enter the tube, pass around the shaft, and leave the tube through the same elongated opening. The tube is slightly longer than the width of the belt to be wound thereon and it has at each end, symmetrically placed protruding lugs 32, which correspond to openings 33 in the flanges placed concentrically around the shaft opening, whereby the lugs on each end of the tube may be inserted into the corresponding openings in the flanges and secured, one flange of which has a D-shaped central opening. Since one end of the reel will be keyed to the shaft, it can be seen that the teeth of the ratchets will always face in one direction, however, by removing the flanges, turning them over and reattaching them, the reel will function in the opposite direction. By removing the pawl bar, however, and placing it in the alternate pair of openings on the other side of the support, by reversing the flanges on the C-tube, by turning over the clutch plate and by turning over the coiled retracting spring 56, the take-up reel can be changed from one that is suitable for right-hand operation to one that is suitable for left-hand operation. In other words, using identical components, a retractor can be assembled for either right hand or left hand operation.

Referring now to the electric signal switch, a cam is driven by a gear train so that the motion of the cam relates to the motion of the reel, but the cam turns at a much slower rate than does the reel. When the belt is not used, it is fully retracted and the cam is positioned to press against the switch arm, causing it to make electric contact with a grounded strip. More explicitly, the switch consists of two conducting parts, insulated from each other when in the open position. The first part is a grounded member, comprising a stationery flat section or strip for contact with a moving member, and having a section angled away from the flat section and positioned for fixed electrical contact with the support. The second part comprises a flexible ribbon of conducting material formed into a connector at one end for the attachment of a lead-in wire, and having a hairpin bend at a point between its two ends. This second strip is supported near the apex of its bend, by a small supporting member which extends outwardly from the inner surface of the housing, leaving the free end of the strip flexible. The end portion of this free length is bent back toward the connector, forming a foot-shaped contact shoe with upturned toe, for cooperation with the grounded strip. The shoe is held in place against its bias by either the outer rim of the ring gear, in which case it is out of contact with the grounded strip, or by the cam surface, in which case it is pressed into electrical contact with the grounded strip. The heel of the shoe rides the perimetrical surface of the ring gear as it rotates, so that, as a sloping ramp or approach surface of the cam reaches the heel of the foot-shaped contact shoe, it urges it into contact with the grounded strip. When the switch is thus closed, and a circuit which includes such a switch, possibly a weight sensitive seat switch, an electric sounding device such as an electric sounder or a light, and a source of power such as the vehicle's battery, is closed, as for example by turning on the ignition switch, the signalling device will indicate that the safety belt is not sufficiently extended to be in use. As sufficient belt is withdrawn, the gear train will move the cam to a position where it no longer depresses the switch arm, and the bias of the switch arm which results from the flexibility of the material of which it is constructed, causes it to lift away from the grounded member and break the contact. The signal device which until the belt was extended, had been indicating that the seat belt was unfastened, is now cut off. The amount of extended seat belt which can be taken as an indication that the seat belt is in use, can vary with the vehicle in which the retractor is placed, as well as with other factors. The mechanism, however, is adjustable to all such circumstances. A small spur gear is fastened to or is a part of the shaft. This spur gear meshes with a larger pinion gear which in turn meshes with the ring gear with internal teeth. This ring gear is kept in place by a housing and a corresponding circular recess at the rear of the housing. By removing the cover of the housing enclosing the gear train and electric switch, the ring gear can easily be removed and reset so that the warning device will be cut off when any preselected minimum length of webbing has been withdrawn from the retractor. The shape and construction of the switch and its relationship to the cam is novel in that a self-cleaning wiping action is achieved between the contact surfaces, thus insuring a positive connection. There is a small opening in the bottom of the case through which a lead-in wire may be inserted and fastened to a connector which has been stamped from the very material which makes up the flexible switch arm. The shape of the shoe is such that when contact is first made, it is between the toe of the shoe and the grounded strip, but as the leading edge or ramp of the cam advances against the switch arm, it causes the leading edge or toe of the shoe to slide along the surface of the grounded strip, thus wiping the contact surfaces with every application and increasing the area of contact, until the maximum pressure is attained and the switch arm rests against that portion of the cam which remains at a fixed distance from its center of curvature. At this point the foot-shaped contact shoe has been forced into a substantially parallel position with respect to the grounded strip, and the maximum amount of conducting surface is in contact with the freshly wiped area of the grounded strip, thus an excellent electrical contact is achieved.

Many modifications or variations of the present invention are possible in the light of the above teachings. It is therefore to be understood that within the scope of the appended claims, the invention may be practiced otherwise than as specifically described.

What is claimed is:

1. In a safety belt retractor having a take-up reel for a safety belt, said reel being keyed to a reel shaft mounted in the retractor, the improvement for signaling when an occupant is not using the safety belt comprising:

an electric switch mounted on the retractor, said switch having a first contact member and a second contact member said first contact member having a contact surface area, said second contact member having a movable section at one end thereof and a stationary section at the other end thereof, said movable section having a contact shoe and means movably supporting said shoe for making a wiping contact with said first contact member when said shoe is moved to engage said first contact member, said contact shoe thereby making self-cleaning electric contact with said contact surface area of said first contact member when said electric switch closes; and a gear train mounted on the retractor and coupled to said reel shaft, said gear train including a ring gear; a raised cam surface on a portion of the perimeter of said ring gear, said cam surface rotating with said ring gear, said switch being normally closed before the safety belt is unwound from the retractor, said second contact member of said switch being opened by said cam surface when the safety belt is initially unwound a predetermined length from the retractor.

2. The safety belt retractor of claim 1 wherein said contact shoe also has a contact surface area which is brought into contact with said contact surface area of said first contact member, thereby providing an area of conducting surface between said first contact member and said second contact member, when said electrical switch closes.

3. The safety belt retractor of claim 1 wherein said second contact member rides upon the surface of the perimeter of said ring gear.

4. The safety belt retractor of claim 1 wherein said contact shoe comprises a portion of said movable section of said second contact member which has been bent back toward said stationary end.

5. The safety belt retractor of claim 1 wherein said cam surface has a radius greater than the radius of said ring gear.

6. The safety belt retractor of claim 1 wherein said cam surface has a length less than one/fourth of the length of said perimeter of said ring gear.

7. The safety belt retractor of claim 1 wherein said supporting means comprises a movable heel of said shoe, and said shoe further including an upturned toe, said upturned toe being normally biased out of contact with said first contact member, said heel of said shoe riding the surface of the perimeter of said ring gear, said toe being adapted to be actuated into contact with said first contact member.

8. The safety belt retractor of claim 1 wherein said second contact member has a bend between said movable section and said stationary section, said movable section and said stationary section having an angle at said bend of less than 90°.

9. The safety belt retractor of claim 5 wherein said gear train further comprises: a spur gear attached directly to the reel shaft at the end of the reel shaft adjacent to the electric switch, and a pinion gear which meshes with said spur gear and with said ring gear, thereby mechanically coupling said ring gear and cam surface to the reel shaft.

10. The safety belt retractor of claim 1 and further comprising a housing for said gear train and said electric switch, said housing having a rear wall which is mounted on said retractor.

11. The safety belt retractor of claim 10 and further comprising a cover for closing said housing, said cover being fabricated of a polymeric material.

12. In a safety belt retractor having a take-up reel for a belt, said reel being keyed to a shaft journaled in a housing, said retractor incorporating a gear train including an integrally toothed ring gear and an electrical switch, said switch comprising two conducting parts insulated from each other when in the open position, the first conducting part being the grounded member, said grounded member comprising a stationary flat strip, said grounded member having a section angled away from the flat section in fixed electrical contact with the housing; the second conducting part comprising a flexible strip of conducting material, formed into a connector at one end for the attachment of a lead-in wire, said flexible strip having a hair-pin bend at a point between its two ends, and said strip being supported at the apex of the bend, leaving the free end flexible, the end of said free end being bent back toward the end having the connector, forming a substantially foot-shaped contact shoe having a flexible heel and an upturned toe, said toe being normally biased out of contact with the gounded strip, with its heel riding the surface of the perimeter of said internally toothed ring gear, said ring gear being driven through said gear train by rotation of the shaft, a cam extending from the periphery of the ring gear having a raised arcuate surface so as to present a smooth camming surface parallel to the outer perimetrical surface of the ring gear, the ends of said cam sloping smoothly to the perimetrical surface of the ring gear, so that as the ring gear rotates, the cam contacts the heel of the foot-shaped contact shoe, and urges the toe against the bias of the flexible strip, into contact with the grounded strip, and as the heel of the contact shoe rides up the approaching sloping surface, the toe is pressed to slide along the surface of the grounded strip with increasing pressure and bending of the shoe at the heel, to gradually force the foot into a substantially parallel position with respect to the grounded strip, thus increasing the area of contact and, simultaneously, wiping and making good, the electrical contact.

13. The safety belt retractor of claim 12 and further comprising an enclosure for said cam, ring gear, gear train, the terminus of the shaft driving the gear train and said electric switch, said enclosure having a rear wall which is contigous with one wall of the housing and fastened thereto, said rear wall of said enclosure having an opening for the terminus of said shaft and at least one fixed spindle, said spindle having a gear for rotation thereon as part of said gear train which drives said ring gear.

14. The safety belt retractor of claim 13 and further comprising a cover for closing said enclosure, said cover being fabricated of a polymeric material, said cover having an opening sized to receive the end of said fixed spindle to add support thereto, said rear wall of said enclosure having a circular recess to guide said ring gear, said enclosure also having an opening adjacent to the switch for a lead-in wire to said switch and a supporting member attached to said rear wall of said enclosure for supporting the flexible strip of conductive material.

* * * * *